RECEIVING MEANS FOR RING SIGNALS

Filed Oct. 1, 1953

INVENTOR
HARALD VALDEMAR ALEXANDERSSON
BY [signature]
ATTORNEY

United States Patent Office 2,852,603

Patented Sept. 16, 1958

2,852,603

RECEIVING MEANS FOR RING SIGNALS

Harald Valdemar Alexandersson, Lidingo, Sweden, assignor to Telefonaktiebolaget L M Ericsson, Stockholm, Sweden, a corporation of Sweden Application October 1, 1953, Serial No. 383,433

Claims priority, application Sweden October 9, 1952

8 Claims. (Cl. 179—1)

The present invention relates to telephone systems, particularly to systems without a source of current supplying the signalling current connected to the subscriber's lines.

Telephone systems of this kind are particularly designed for marine use including the use on warships.

There are known single instrument telephone systems of the general kind above referred to. However, frequently the need arises to connect several instruments to the system. It has been heretofore found to be difficult if not impossible, to operate a telephone system including several instruments without a source of current supplying the required signalling or ringing current. As a result, a source of current such as a battery has been connected to the telephone system for the purpose of energizing the signal receiving means. The use of a battery impairs the operational reliability of the system under certain circumstances for instance, when the same is installed on a warship operating under combat conditions and abruptly altering its speed. Such conditions make difficult or impractical the use of signalling devices and related equipment as conventionally used in telephone systems.

Accordingly, the principal object of the present invention is to provide a novel and improved telephone system of the general type above referred to including one or several instruments, the signal receiving means of which are capable of reliably operating under all operational conditions that may be encountered without the use of a source of current such as a battery supplying the signalling current.

The invention is chiefly characterized by the signal receiving means being provided with a mechanically balanced armature, which operates a visible signal device over a stepping mechanism. The stepping mechanism is suitably provided with a reduction gear, and it is especially advantageous to design that gear as a friction clutch of a special kind.

Figures 1, 2, 3:
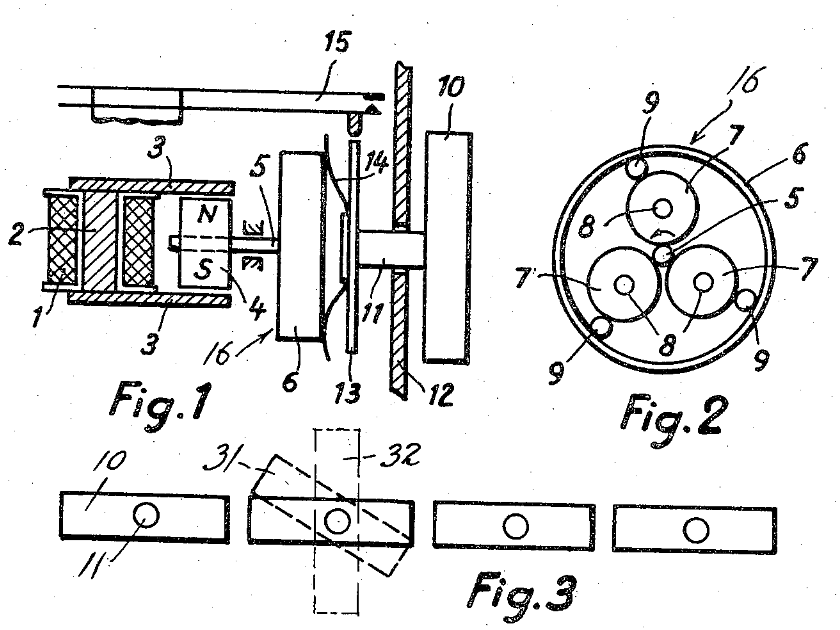
Figure 4:
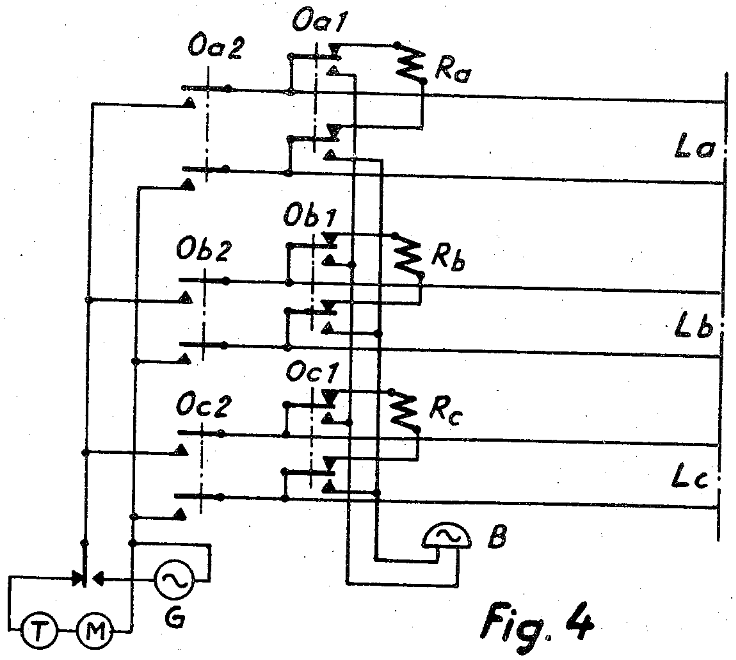

The invention will be described more closely with reference to the accompanying drawings. Fig. 1 illustrates the structure of the signal receiving means. Fig. 2 shows the principle of a suitable embodiment of the stepping mechanism and of the reduction gear. Fig. 3 indicates the suitable location of four signal wheels. Fig. 4 shows a connection diagram for a telephone system with three outgoing lines.

The signal receiving means is equipped with a polarized magnet system, consisting of a coil 1, a core 2 and two pole shoes 3. Between these a permanent magnet 4 with pole shoes N and S is swinging, said magnet being fixed on a shaft 5. The magnet 4 is fastened to the shaft 5 in such a manner, that the magnet forms a mechanically balanced armature lying between the poleshoes. When alternating current is flowing through the coil 1, the magnet 4 swings to and fro, thereby rotating the shaft 5, which directly operates a stepping mechanism generally designated by 16. The stepping mechanism, Fig. 2, comprises a shaft 5 mounted between three rolls 7, each of which is rotatably mounted on a pin 8. The peripheries of the rolls 7 are in engagement with three balls 9, which, by means of a spring (not shown on the drawing), are lightly pressed between the rolls and an outer rotatable cylinder 6. If the shaft 5 is moved in the direction of the arrow, the whole device works as a free wheel and the outer cylinder remains stationary. In the other direction of movement of the shaft, however, said shaft 5 and the cylinder 6 are frictionally coupled by balls 9 becoming wedged between rolls 7 and cylinder 6, so that the cylinder rotates a distance corresponding to the rotation of the shaft. The relation between the angle of rotation of the cylinder and the angle of rotation of the shaft is the same as the relation between the diameter of the shaft and the diameter of the cylinder, and therefore a considerable gear reduction of the angle of rotation is obtained. This is convenient, since it is desired, that the signal means should be able to overcome rather great friction resistances arising during the work of the device.

The stepping mechanism 16, Fig. 1, operates, by means of a friction clutch shaped as a spring 14, the visible part of the signal means, shown as a signal for 10, the shaft 11 of which passes through the front plate 12 of the apparatus. A cam disc 13 is mounted on the shaft 11, and both the shaft 11 and the cam disc are frictionally connected to the stepping mechanism 6 by means of a spring 14. The cam disc 13 operates one or several contact spring groups 15.

When an alternating current signal is received in the coil the armature formed by permanent magnet 4 swings to and fro, that is, it makes small angular movements in unison with the shaft 5. The shaft 5 thereby steps the cylinder 6 forward and said cylinder rotates the cam disc 13 and the signal bar 10 forward by means of the friction spring 14, cylinder 6 thus consitutes a rotary output member. After a certain angular motion the cam disc operates the contacts 15, which are suitably made so as to disconnect the coil 1 and instead to connect a signal device, for example a bell, common to several signal receiving arrangements. The signal is then both seen and heard, the pertaining bar having turned as is for example indicated for the second signal bar from the left in Fig. 3, which gives an example of a suitable embodiment of several signal bars and their location relative to each other.

Fig. 4 illustrates how the signal receiving means shown in Figs. 1–3 operates in a telephone system with three outgoing lines L*a*, L*b*, L*c*. Said lines can be connected each to a similar instrument. Each line has its ring signal receiving means, the windings R*a*, R*b* and R*c* of which corresponding to the coil 1, Fig. 1, are shown. To each line pertains a pair of contacts or switches O*a*1—O*a*2, O*b*1—O*b*2, O*c*1—O*c*2, respectively, corresponding to the contacts 15, Fig. 1. At rest each one of the lines is connected to one of the said windings R*a*, R*b*, R*c*. If a ring signal is received on for example line L*a*, the means corresponding to the means 4—15, Fig. 1, is operated over the winding R*a*, and after a short while the switch O*a*1, corresponding to the contact 15, is working, so that the bell B is connected. The signal is then heard, and owing to the ring signal means rotating the respective signal bar 10 into dotted line position 31 it is possible to see which line is calling. If the signal bar of the ring signal means is rotated into the dotted line position 32, the microtelephone MT is connected by means of the switch O*a*2, so that a speech connection is obtained over the line L*a*. When the communication is ended, the signal bar is manually rotated back to its initial position. Outgoing communications are set up by the manual return of signal bar so that O*a*2 is actuated. By means of the generator G a ring signal is thereafter sent out on the line L*a* and the steps described above are repeated at the other end of the line L*a*.

As appears from the description above, all movable parts of the receiving means are mechanically balanced and normal changes in speed of the body on which they are mounted such as a ship cannot affect their working manner. Owing to the primary movement being reduced by means of a gear, a power is also obtained sufficiently great to operate a large and rugged signal means, which can resist the hard treatment signalling devices of the kind here involved are exposed to.

I claim:

1. A signal receiving device for use in a telephone system of the kind described, said device comprising an exciting coil means, a mechanically balanced rotary armature means including a drive shaft, said armature means being reciprocatory by energization of the coil means with alternating current, a stepping mechanism coupled with said shaft for unidirectional rotation thereby, said mechanism including a rotary output member and reduction gear means interposed between said drive shaft and said output member, and visual signal means coupled with said output member for operation by said member upon rotation thereof by the shaft through a predetermined angle.

2. A signal receiving device according to claim 1, wherein said reduction gear means include one-way transmission means coupling said drive shaft with said output member.

3. A signal receiving device according to claim 2, wherein said output member comprises a hollow cylinder disposed coaxially with said shaft and said transmission means and said reduction gear means comprise coacting sets of rollers interposed between said shaft and cylinder and having diameters correlated to step down the transmission of the angular movement of the shaft to the cylinder, said rollers being in motion transmitting frictional engagement upon rotation of the shaft in one direction and freely sliding upon rotation of the shaft in opposite direction.

4. A signal receiving device according to claim 1, wherein said signal means comprise a member having a configuration such as visually to indicate by its position the actuation of the signal means.

5. A signal receiving device according to claim 4 and having several indicating members placed side-by-side, each of said members having a configuration such as visually to indicate displacement of one of the members relative to the others.

6. A signal receiving device according to claim 1 and further comprising electrically operated audible signal means, and switch means controlling an energizing circuit for said audible signal means and including a switch actuating member connected to said stepping mechanism for unidirectional rotation in unison therewith, said actuating member actuating said audible signal means to produce an audible signal upon a predetermined angular rotation of said shaft.

7. A signal receiving device according to claim 6 and further comprising telephone means, and second switch means controlling an energizing circuit for said telephone means and including a switch actuating member connected to said stepping mechanism for unidirectional rotation in unison therewith, said actuating member actuating said telephone means upon a predetermined further rotation of said drive shaft.

8. A circuit system including several signal receiving devices as defined in claim 7, said audible signal means and said telephone means being common to all said signal receiving devices and connected in circuit with said first and second switch means for independent control by the actuating member of each respective switch means.

References Cited in the file of this patent

UNITED STATES PATENTS

| | | |
|---|---|---|
| 1,400,050 | Grace | Dec. 13, 1921 |
| 1,433,562 | Mansbendal | Oct. 31, 1922 |
| 1,655,698 | Chauveau | Jan. 10, 1928 |
| 1,787,620 | Earvarger | Jan. 6, 1931 |
| 2,487,678 | Stickel | Nov. 8, 1949 |

FOREIGN PATENTS

| | | |
|---|---|---|
| 3,878 | Great Britain | Feb. 17, 1913 |